E. N. McCALL.
TROLLEY HEAD.
APPLICATION FILED DEC. 21, 1908.

977,416.

Patented Nov. 29, 1910.
2 SHEETS—SHEET 1.

Witnesses
Albert L. Key

Inventor
Earl N. McCall
By Chandlee & Chandlee
Attorneys

E. N. McCALL.
TROLLEY HEAD.
APPLICATION FILED DEC. 21, 1908.
977,416.
Patented Nov. 29, 1910.
2 SHEETS—SHEET 2.
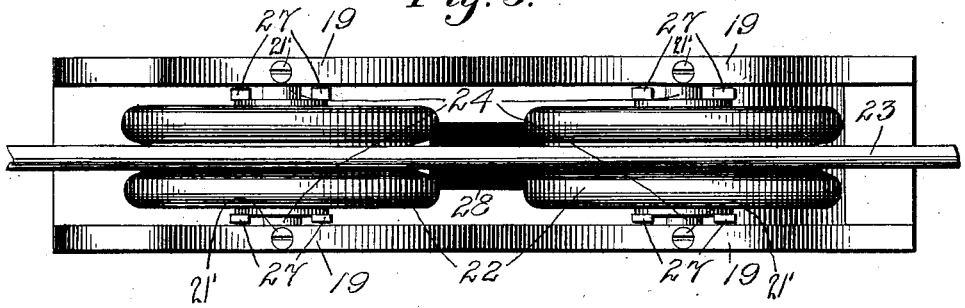
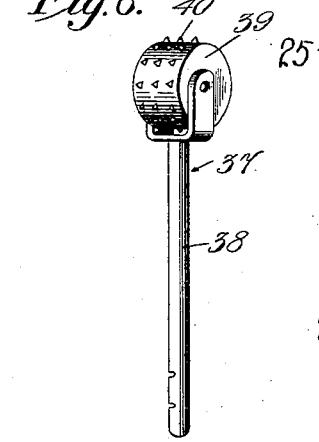
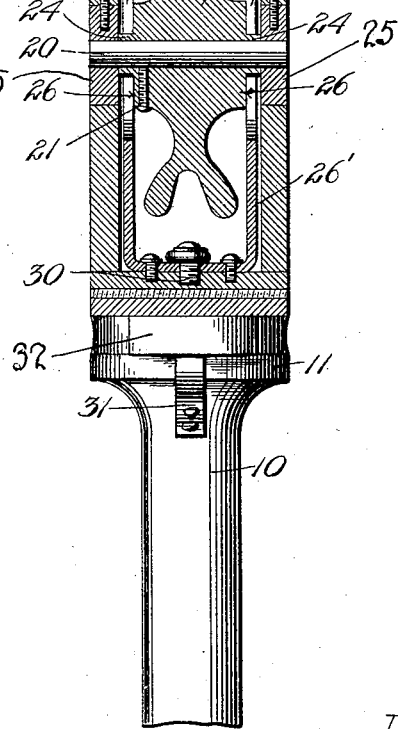
Witnesses
Albert L. Krey
Inventor
Earl N. McCall
By Chandler & Chandler
Attorney

UNITED STATES PATENT OFFICE.

EARL N. McCALL, OF GOLDFIELD, NEVADA.

TROLLEY-HEAD.

977,416.  Specification of Letters Patent.  Patented Nov. 29, 1910.

Application filed December 21, 1908. Serial No. 468,646.

*To all whom it may concern:*

Be it known that I, EARL N. McCALL, a citizen of the United States, residing at Goldfield, in the county of Esmeralda, State of Nevada, have invented certain new and useful Improvements in Trolley-Heads; and I do hereby declare the following to be a full, clear, and exact description of the invention, such as will enable others skilled in the art to which it appertains to make and use the same.

The invention relates to trolley heads and more particularly to the class of trolley heads for collecting current for electric railways.

The primary object of the invention is the provision of a trolley head in which there are mounted two or more trolley wheels which latter contact and travel upon a trolley wire charged with current that is adapted to be collected by peculiar means coöperative with the trolley means to deliver the said current directly to the motor of an electric railway car.

Another object of the invention is the provision of a trolley head having current collecting means to deliver a current from the overhead trolley wire in a unique and positive manner to the motor of an electric railway car and which means is simple in construction and thoroughly efficient in operation.

A still further object of the invention is the provision of a trolley head for electric railways in which there are provided a plurality of trolley wheels having coöperative current collecting means to convey a current from the overhead trolley wire to the motor of an electric railway car whereby the current is utilized for causing the travel of the railway car.

A still further object of the invention is the provision of a trolley head for electric railways which shall be cheap to manufacture but yet has the requisite amount of strength and that is capable of automatic adjustment on a pole whereby it can at all times be maintained in proper alinement relative to a trolley wire.

With these and other objects in view the invention consists in the construction, combination and arrangement of parts as will be hereinafter more fully described, illustrated in the accompanying drawings, disclosing the preferred form of embodiment of the invention and pointed out in the claim hereunto appended.

Figure 1:
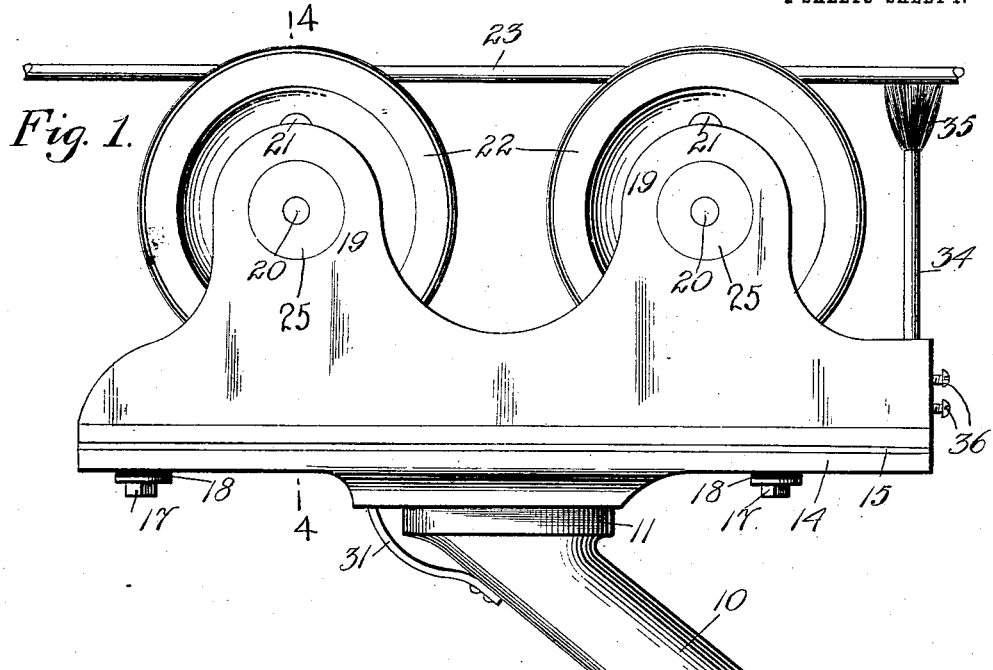
Figure 2:
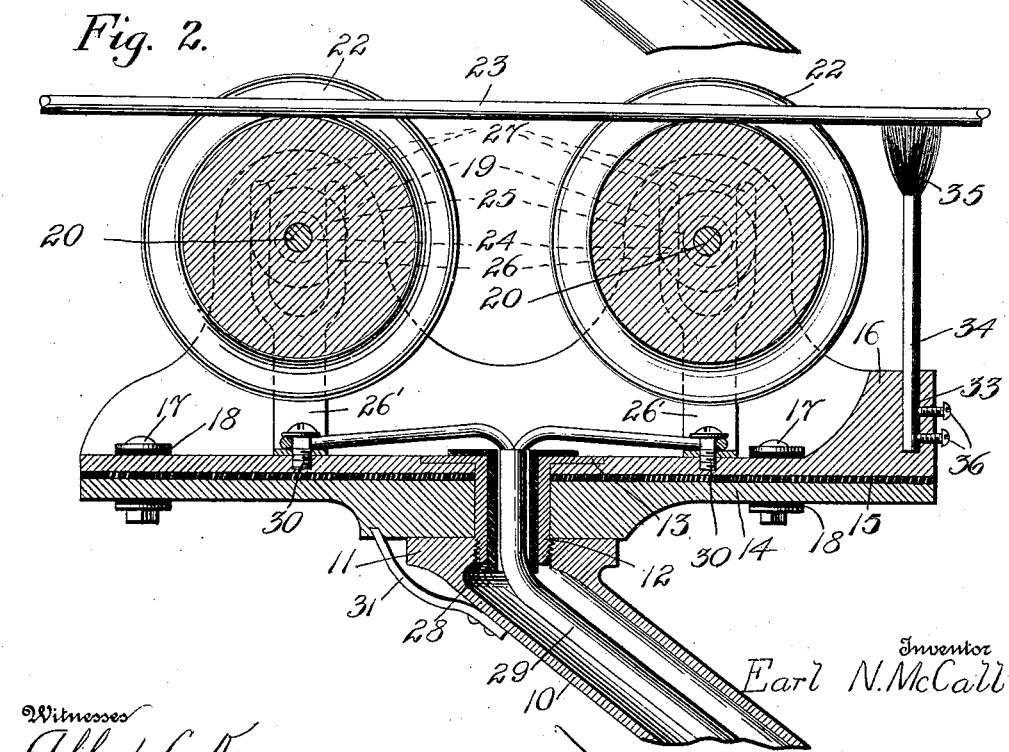

In the drawings:—Figure 1 is a side elevation of a trolley pole, trolley wire and the trolley head embodying the invention mounted upon the pole and in contact with the wire. Fig. 2 is a vertical longitudinal sectional view through the head and pole. Fig. 3 is a top plan view of the head. Fig. 4 is a sectional view on the line 4—4 of Fig. 1. Fig. 5 is a detail side elevation of a brush adapted to be detachably mounted upon the head for cleaning the trolley wire. Fig. 6 is a detail perspective view of an ice scraper to be mounted in lieu of the brush for scraping the trolley wire.

Similar reference characters indicate corresponding parts throughout the several views in the drawings.

Referring to the drawings by numerals 10 designates the trolley pole which is of hollow cylindrical formation of the ordinary well known construction having formed integral at its upper end a circular flat bearing terminal 11 having a central aperture communicating with the bore of the trolley pole, the opening has threaded therein a hollow stem 12 formed with an annular flange 13 and around which stem is swiveled a base or main supporting plate 14 of substantially rectangular shape upon which is mounted an insulating sheet of material such as mica the same being of a size corresponding to the plate and upon which is superimposed a head casting 16 the latter being also of corresponding shape relative to the supporting plate and is counterbored to receive the flange 13 of the stem 12 so that its upper face will be flush with the upper face of the base of the casting.

The head casting 16 is fixed to the supporting plate 14 by means of bolt members 17 which are insulated both from the supporting plate and head casting by means of insulating sleeves 18 surrounding the said bolt members, the latter being passed through the base of the casting, the mica sheet and the supporting plate. Rising from opposite longitudinal sides of the head casting 16 are vertical alining bearings 19 in which are journaled stud axles 20 the same supporting trolley wheels 22 which are fixed to the axle by means of set screws 21, the trolley wheels being adapted to contact with a trolley wire 23 of the ordinary construction which is charged with an electric current.

Extending laterally centrally from opposite sides of the trolley wheels 22 circumferentially of the axles 20 are annular shoulders 24 the outer faces of which contact with removable collars 25 which surround the outer ends of the axles and are disposed in openings of a corresponding size thereto in the vertical bearings 19, the collars 25 being held fixed in the said vertical bearings by means of set screws 21' carried by the bearings and engaging said collars. These collars 25 by reason of the shoulders 24 projecting outwardly from opposite sides of the wheels are spaced from the contact faces 26 of the said trolley wheels for a purpose as will be hereinafter more fully described.

Secured to the base of the head casting 16 are inverted U-shaped resilient members 26' which latter have their legs bifurcated at their upper ends to form forked resilient extremities 27 to straddle the annular shoulders 24 of the trolley wheels so that the said extremities 27 will constantly contact with the contact faces 26 of the trolley wheels between the latter and the said collars 25 carried by the vertical bearings of the casting head.

Within the hollow stem 12 is an insulating sleeve 28 through which passes the electric current carrying lead wires 29 which latter have their upper terminals connected to binding posts or screws 30 passed through the inverted U-shaped collector members 26' and engaging the base of the head casting, the said posts 30 serving to connect the terminals of the wires 29 to the collector members and also to connect the lead to the head casting. These lead wires 29 pass down through the hollow trolley pole to the motor (not shown) of an electric railway car.

Attached to the trolley pole 10 at the upper end thereof is a spring finger 31 the free end of which engages in an arcuate shaped recess in an offset 32 projecting rearwardly from the head casting 16, the spring being adapted to maintain the trolley head steady and against free shifting movement on the pole. This spring has its free end frictionally engaging the side walls of the arcuate shaped recess in the offset 32 so that the trolley head when engaging the trolley wire will be held against free rotation upon the trolley pole so that the said head will constantly aline with the trolley wire during the travel of a railway car yet the said head is permitted to slightly turn when the railway car is taking a curve in the track.

At the forward end of the head casting 16 in advance of the small trolley wheel there is formed a socket 33 in the front wall of the said casting in which is detachably mounted a stem 34 of a brush 35 which is adapted to contact with the trolley wire 23 in advance of the trolley wheels 22 so as to clean the said trolley wire of accumulated substances thereon. The said stem 34 of the brush is secured in the socket 33 by means of the usual set screws 36 thus by the use of the latter the said stem may be detached and in lieu thereof an ice cleaner 37 can be mounted in the said socket. This ice cleaner comprises a stem 38 having pivotally mounted in its upper forked end a roller 39 provided with a corrugated or roughened working face 40 for contact with the trolley wire so as to cut the accumulated ice or sleet upon the said wire.

It will be noted that an electric current is collected from the trolley wire 23 through the medium of the trolley wheels 22 traveling thereon and is conveyed by the forked extremities 27 of the collecting members 26' through the electric wires 29 to a motor (not shown) or an electric railway car. The annular shoulders 24 prevent lateral displacement of the trolley wheels 22 should the set screws 21 therein become loose and thereby obviate the possibility of the said trolley wheels disengaging the trolley wires while the wheels are traveling thereon. The reason for employing the detachable collars 25 is that the rotation of the axle will not wear away the vertical bearings 19 of the head casting but will wear directly upon the said collars 25.

What is claimed is:—

The combination with a trolley pole having an enlarged flat bearing terminal, of a casting having a base with spaced vertical bearings rising therefrom, a supporting plate secured to the base of the casting and insulated therefrom, the said supporting plate being provided with a central flat faced boss resting upon the bearing terminal of the pole, the said base of the casting being provided with a central countersink, a hollow stem loosely passed through the base of the casting and the supporting plate and having one end inserted in the bearing of the trolley pole, a head formed on the opposite end of the hollow stem and received in the countersink, whereby the outer surface of the head will lie flush with the outer surface of the base of the casting, trolley wire engaging wheels journaled in the bearings, and yieldable collector elements fixed to the base of the casting and having resilient forked extremities engaging opposite sides of the said wheels.

In testimony whereof, I affix my signature, in presence of two witnesses.

EARL N. McCALL.

Witnesses:
 JOHN R. DALEY,
 P. W. DALEY.